Sept. 9, 1958 J. R. ROBINSON 2,850,958
ROW MARKERS FOR PLANTERS AND TRACTORS
Filed May 13, 1957 2 Sheets-Sheet 1

INVENTOR.
James R. Robinson
BY Scott L. Norris,
Atty.

Sept. 9, 1958  J. R. ROBINSON  2,850,958
ROW MARKERS FOR PLANTERS AND TRACTORS
Filed May 13, 1957  2 Sheets-Sheet 2

INVENTOR.
James R. Robinson
BY Scott L. Norvid
atty

United States Patent Office 2,850,958
Patented Sept. 9, 1958

2,850,958

ROW MARKERS FOR PLANTERS AND TRACTORS

James R. Robinson, Buckeye, Ariz.

Application May 13, 1957, Serial No. 658,828

2 Claims. (Cl. 97—230)

This invention pertains to row markers to be used on tractors or combination planters or drills for setting out seeds or crops.

This row marker is of the type attached to the front end of the tractive vehicle and one of the objects of the invention is to provide a row marker which will definitely mark the rows on one side of the vehicle as it travels along an already marked row in the process of planting, and will automatically swing to the opposite side of the tractor at the end of the row when the tractor is backed and its direction reversed as it traverses the next marked row;

Another object is to provide a row marker adapted to be attached to the front end of a tractor with a pivotal mount so that it is free to swing from one side of the tractor to the other; said mount having a brace extending from the end of the row marker beam to a point centrally positioned ahead of its pivotal mount; said parts being arranged to permit the marker to swing from side to side in front of the tractor as the tractor is backed and turned at the end of each row;

Still another object is to provide a row marker for tractive planters, or the like, consisting of a beam pivotally mounted at the front end of the tractor and having a steel marking device at its outer end which is pivotally mounted so as to be reversible, together with a brace beam pivotally mounted on the tractor ahead of said marking beam and slidably attached to the marking beam to permit swinging the marking beam from side to side as the tractor is turned and without the necessity of manual operation by the driver of the planter;

Still another object is to provide a marking beam, as above described, having means for adjustment as to the distance between rows marked and an adjustment as to the angle at which the marking beam extends from the tractor.

Other objects will appear hereinafter.

I attain the foregoing objects by means of the device, parts and combinations of parts shown in the accompanying drawings, in which—

Similar numerals refer to similar parts in the several views.

Figure 1:
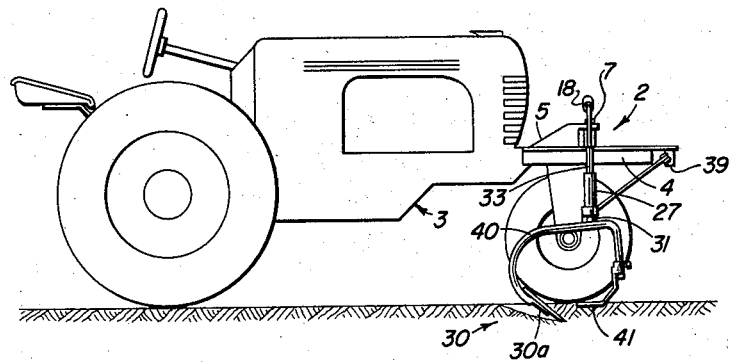
Figure 1 is a side elevation of a tractor equipped with a row marker embodying my invention.

The row marker 2 is attached to the tractor 3 by a base frame 4. The attachment is made at the front end of the tractor on the nose portion 5 and extends forwardly therefrom. On the base frame 4 there is a vertical pivot shaft 7 which journals the bearing 8 of bracket body 10. On the lower portion of this bracket there is a lower arm 12 having a yoke 13 for the vertical pivotal attachment of the row marker beam 14, made of steel tubing or other suitable material, and in upper portion there is an upper arm 16 which supports a cylindrically housed spring 18 terminating outwardly with a hook 19. A chain 20 on hook 19 is used to provide adjustment of beam 14, by attachment to supporting rod 22 which is attached at its outer end to the outer end portion of beam 14 by a clevis 23. A beam extension tube 25 telescopes into the outer end of beam 14 and is secured by set screws 26. At the outer end of the extension tube 25 there is a substantially vertical sleeve bearing 27. The marking plow 30 has an upwardly extending shaft 31 which is journalled within the sleeve bearing 27 and a collar 32 limits the upward movement of shaft 31 while a cotter pin 33, extending through a transverse hole in the upper end of shaft 31, limits its downward motion. It is to be understood that the marking plow 30 is in this way pivotally supported on the outer end of the adjustable extension 25 on the outer end of beam 14.

Figure 3:
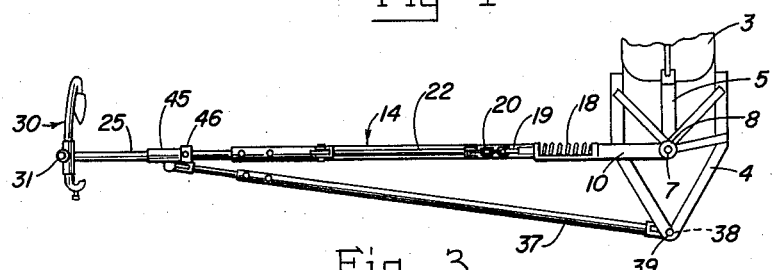
Figure 3 is a plan view of the marker.
Figure 2:
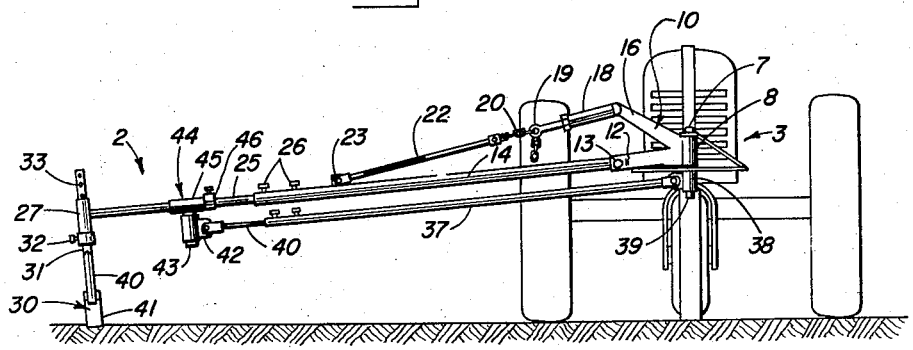
Figure 2 is a front elevational view thereof.
Figure 4:
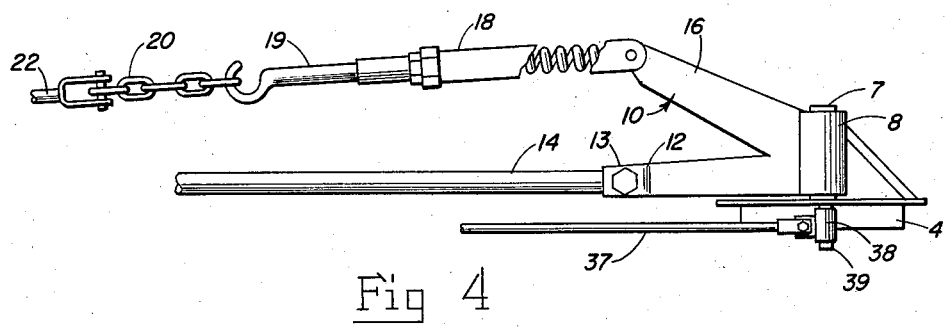
Figure 4 is a front elevational view of the pivotal support of the row marker on a tractor attaching frame, drawn on an enlarged scale.
Figure 5:
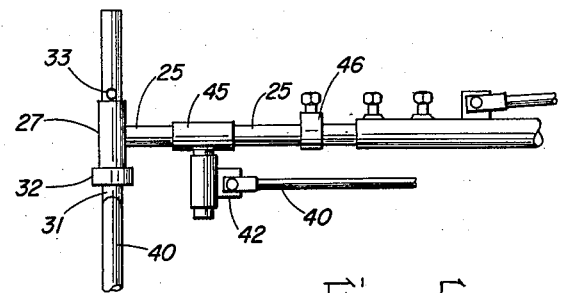
Figure 5 is a front elevational view of the outer end of the row marker beam showing adjusting means for varying the distance between rows to be marked and the angle at which the marker beam extends from the tractor.

A brace beam 37 is pivotally attached to shaft 39 by sleeve bearing 38 on frame 4 at a point forward from the pivot shaft 7. Brace beam 37 is tubular and has a telescoping extension 40 at its outer end which is attached by a clevis 42 to a downwardly extending leg 43 of a slide 44. The slide 44 includes a substantially horizontal sleeve 45 which slides on the outer extension tube 25 of beam 14. The inner end of sleeve 45 bears against a collar 46 which is adjustably secured on beam extension 25. When the beam 14 is extended substantially at right angles to the length of the tractor 3 the collar 46 is fixed, as shown in Figure 3. However the angle of the beam relative to the tractor may be varied by changing the position of the collar on extension 25.

The brace beam 37 provides a means for holding the beam 14 in its extended lateral position on either side of tractor 3. When turns are to be made, slide 44 permits beam 14 to swing forward and around the pivot shaft 7 to the opposite side of the tractor where it will again hold the beam in the extended lateral position and at the angle desired. Since brace beam shaft 39 is forward from shaft 7 the slide 44 moves outward on extension tube 25 of beam 14 as the beam swings forward and moves back toward collar 46 as the beam 14 swings to the side of the tractor.

When the beam 14 assumes a new position on the opposite side of the tractor 3 from that where it was previously positioned the marking plow 30 pivots on shaft 31 in bearing 27 and assumes the correct marking position.

In the form shown the marker plow share 30a is supported on the horizontal C-shaped beam 40. This has a depth limiting plate 41 at the front, and the share 30a is positioned at the rear and somewhat rearward from the center of shaft 31.

Figure 6:
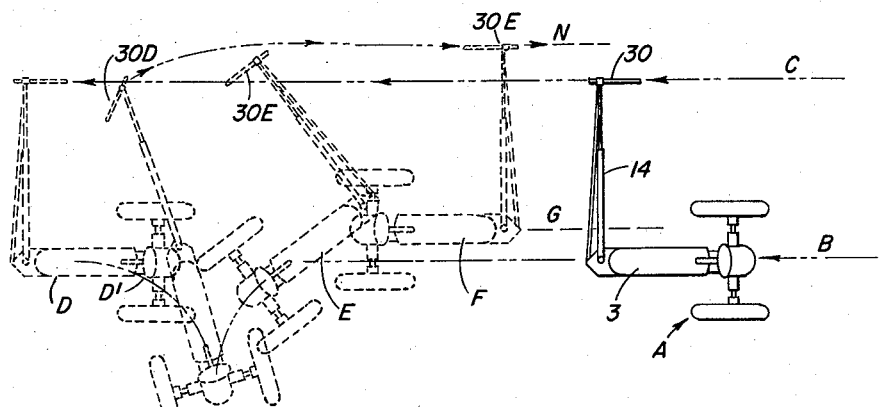
Figure 6 is a diagrammatic view of the action of the tractor and row marker in making a turn at the end of a marked row.

Referring to Figure 6, the tractor in position A is advancing along row B planting seed in the usual manner and the marker 30 is advancing along row C. As the tractor reaches the end of the field, as indicated by position D it is stopped and reversed, as indicated by the D'. The marker 30D then leaves the row C, as shown. Thereafter, the tractor is moved forward again to the position indicated by the dotted outline E. At this time the marker 30E moves upward from the marked line C and finally, when the tractor is fully turned around, as indicated by F, it follows a row, indicated by dotted line N, which is a predetermined distance above the line B and by this time the marker indicated by 30E is proceeding along the new line, marked N.

This diagrammatic representation of the movements of the tractor indicates that whereas in the first position A the marker is on their right hand side of the tractor in its direction of motion and after the turn in position E, the marker 30E is on the left hand side of the tractor in its direction of motion. The same procedure takes place at the opposite side of the field, the tractor being backed and turned around and following a new line which was marked previously.

I claim:

1. A row marker for use on the front end of a steerable power driven planting implement, consisting of a base frame adapted to be attached to the front end of the implement, a marker supporting beam pivotally mounted at its inner end to said base frame, a row marking device pivotally mounted at the outer end of said beam, a supporting arm including a spring pivotally mounted on said frame and attached to the end portion of said marker for resiliently supporting the marker beam, and a brace beam pivotally supported at its inner end to said base frame at a position ahead of the pivotal mounting of said marker supporting beam, and slidably attached to the outer portion of said marker supporting beam, and a slide stop on the outer portion of said marker beam limiting the inward sliding movement of the outer end of said brace beam on said marker beam so that the brace beam will hold the marker beam in a position laterally extended from said either side of said implement during forward movement, and will permit the marker beam to swing forward around the front of the implement during backing and turning movement of said implement.

2. In a row marker for use on a steerable power driven planting implement to provide automatic swinging from side to side of the implement as it is turned at the ends of plant rows, consisting of a base frame attached to the front end of the tractor having an upwardly extending row marker beam shaft, and a downwardly extending shaft for a brace beam, forwardly disposed from said row marker beam shaft, a bracket journalled on said row marker beam shaft having an upper arm and a lower arm, a row marker beam pivotally attached to the lower arm of said bracket to hinge vertically, a supporting rod and a spring extending from the upper arm of said bracket to the outer portion of said marker beam resiliently supporting said beam vertically, a beam extension tube telescopically adjustable on the outer end of said beam, a row marking device pivotally mounted on a substantially vertical bearing on the outer end of said beam extension tube, a brace beam having its inner end pivotally attached to the forward shaft on said base frame and its outer end pivotally attached to a slide operating on said beam extension tube, a stop collar on said extension tube to limit sliding movement of said slide on said tube and hold said beam in an outward laterally extended position when said implement is driven forward; said slide moving outward on said tube to permit said marking beam to swing around the front of said implement when it is turned by backing.

References Cited in the file of this patent

UNITED STATES PATENTS

| | | |
|---|---|---|
| 270,350 | Turner | Jan. 9, 1883 |
| 751,176 | Jones | Feb. 2, 1904 |
| 959,845 | Dawes | May 31, 1910 |